United States Patent
Chou

(10) Patent No.: US 8,433,109 B2
(45) Date of Patent: Apr. 30, 2013

(54) DIRECTION CONTROLLING SYSTEM AND METHOD OF AN ELECTRONIC DEVICE

(75) Inventor: Meng-Chieh Chou, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 877 days.

(21) Appl. No.: 12/543,592

(22) Filed: Aug. 19, 2009

(65) Prior Publication Data
US 2010/0164864 A1  Jul. 1, 2010

(30) Foreign Application Priority Data
Dec. 26, 2008  (CN) .......................... 2008 1 0306591

(51) Int. Cl.
*G06K 9/00*  (2006.01)
(52) U.S. Cl.
USPC ........................... 382/124; 382/132; 382/294
(58) Field of Classification Search .................. 382/124, 382/132, 284
See application file for complete search history.

(56) References Cited

U.S. PATENT DOCUMENTS

| | | | | |
|---|---|---|---|---|
| 5,363,453 A | * | 11/1994 | Gagne et al. .................. | 382/125 |
| 6,031,942 A | * | 2/2000 | Nakayama .................... | 382/284 |
| 6,134,340 A | * | 10/2000 | Hsu et al. ....................... | 382/124 |
| 7,194,116 B2 | * | 3/2007 | Du et al. ........................ | 382/124 |
| 2003/0035569 A1 | * | 2/2003 | Chau .............................. | 382/124 |
| 2003/0118218 A1 | * | 6/2003 | Wendt et al. ................... | 382/124 |
| 2005/0152606 A1 | * | 7/2005 | Wood ............................ | 382/232 |
| 2005/0201597 A1 | * | 9/2005 | Wendt et al. ................... | 382/125 |
| 2005/0238211 A1 | * | 10/2005 | Du et al. ........................ | 382/124 |
| 2006/0210128 A1 | * | 9/2006 | Chou et al. .................... | 382/124 |
| 2008/0063245 A1 | * | 3/2008 | Benkley et al. ................ | 382/124 |
| 2008/0219521 A1 | * | 9/2008 | Benkley et al. ................ | 382/124 |
| 2009/0058595 A1 | * | 3/2009 | Mainguet et al. ............. | 340/5.53 |

* cited by examiner

*Primary Examiner* — Vu Le
*Assistant Examiner* — Aklilu Woldemariam
(74) *Attorney, Agent, or Firm* — Altis Law Group, Inc.

(57) ABSTRACT

A direction controlling system and method of an electronic device provides a fingerprint identification device for a user to touch. The electronic device captures a fingerprint template image of a finger. When the finger moves on the fingerprint identification device, the electronic device captures a sequence of fingerprint images of the finger. Furthermore, the electronic device detects a directional movement of the fingerprint according to the sequence of fingerprint images and the fingerprint template image. A scroll bar of the electronic device is controlled to move according to the movement direction and a movement distance calculated by the electronic device.

13 Claims, 6 Drawing Sheets

DIRECTION CONTROLLING SYSTEM AND METHOD OF AN ELECTRONIC DEVICE

BACKGROUND

1. Technical Field

Embodiments of the present disclosure relate to direction operation systems and methods, and more particularly to a direction controlling system and a method of an electronic device.

2. Description of Related Art

A direction controlling device of an electronic device may be used to select menus displayed on the electronic device. A joystick is commonly used for the direction controlling device to control operation of the electronic device. However, the joystick may not be sensitive enough after the joystick is long time used, causing the user to have to press the joystick forcibly or many times.

Therefore, an effective system and method is needed for overcoming the above-described shortcomings.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
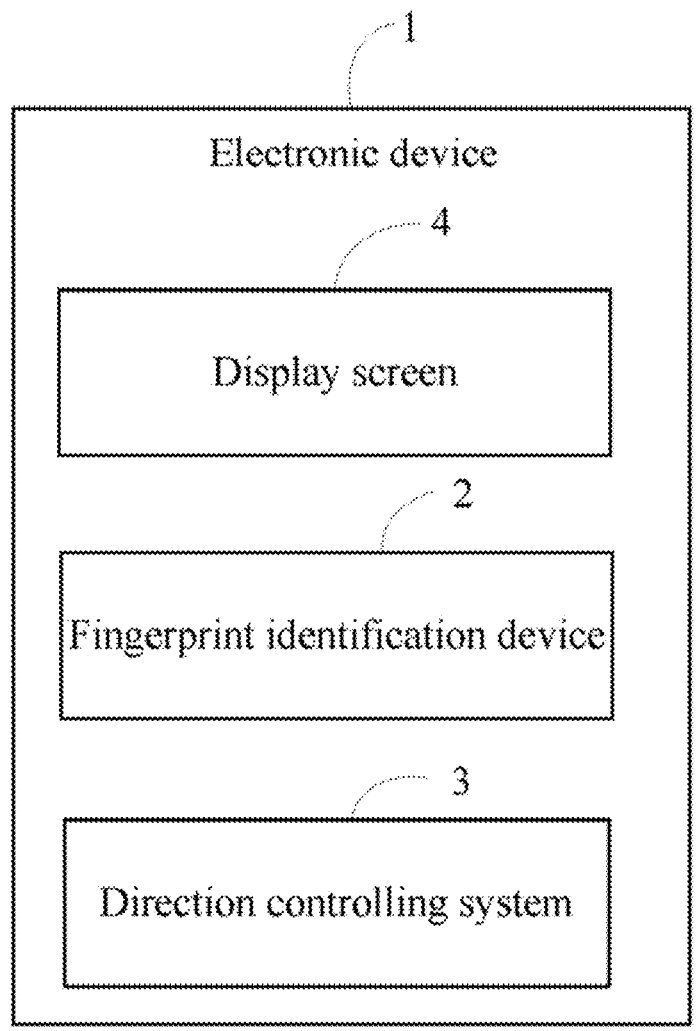
FIG. 1 is a block diagram of one embodiment of a direction controlling system of an electronic device.

FIG. 1 is a block diagram of one embodiment of a direction controlling system 3 of an electronic device 1. The direction controlling system 3 is for controlling operation of the electronic device 1. In one embodiment, the electronic device 1 may be a mobile phone, or a notebook. The electronic device 1 includes a fingerprint identification device 2, and a display screen 4. In one embodiment, the identification device 2 may be a touch screen, so a finger should move on the identification device 2.

In one example, the current icon displayed on the display screen 4 is "phone book". If a user wants to browser a next icon "short message", the user must move the finger on fingerprint identification device 2 in a downward direction. The direction controlling system 3 obtains fingerprints of the finger, and detects the direction of the finger has moved. The direction controlling system 3 controls the "short message" icon displayed on the display screen 4. When a finger moves on the fingerprint identification device 2, the direction controlling system 3 captures a sequence of fingerprint images of the finger. Then the direction controlling system 3 determines a directional movement of the fingerprints according to the sequence of fingerprint images.

Figure 4:
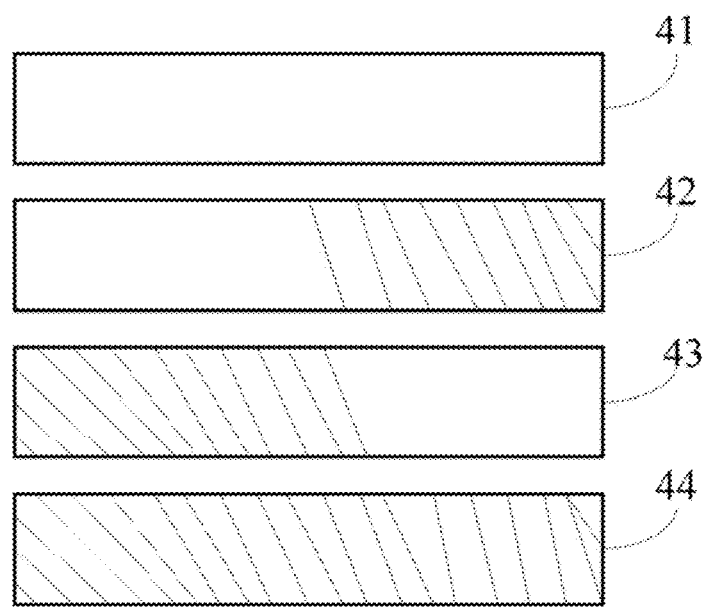
FIG. 4 illustrates one embodiment of different types of fingerprint images.

Furthermore, the direction controlling system 3 transforms the fingerprint images to fingerprint binary images. In one embodiment, the binary images may be monochrome images. The direction controlling system 3 reduces luminance of the binary images to contrast a fingerprint pattern and a background color in the fingerprint images. In one embodiment, the captured images may include three types: blank images, partially fingerprinted images, and fully fingerprinted images. A blank image does not include a fingerprint. A partially fingerprinted image is an image with a partial fingerprint pattern and blank areas. A full fingerprint image is an image fully encapsulating a fingerprint pattern. The partially fingerprinted image may be, but not limited to, a left fingerprinted image or a right fingerprinted image. A left fingerprinted image includes blank areas in a left side of the fingerprint image. A right fingerprinted image includes blank areas in a right side of the fingerprint image. As shown in FIG. 4, the fingerprint image 41 is a blank image, the fingerprint image 42 is a left fingerprinted image, the fingerprint image 43 is a right fingerprinted image, and the fingerprint image 44 is a fully fingerprinted image. In one embodiment, a size of the fingerprint identification device 2 is about 1*1 centimeter^2 (cm^2), which is smaller than a fingertip, thus it should be understood that there are blank areas in both in a left side and a right side in one fingerprint image.

Figure 2:
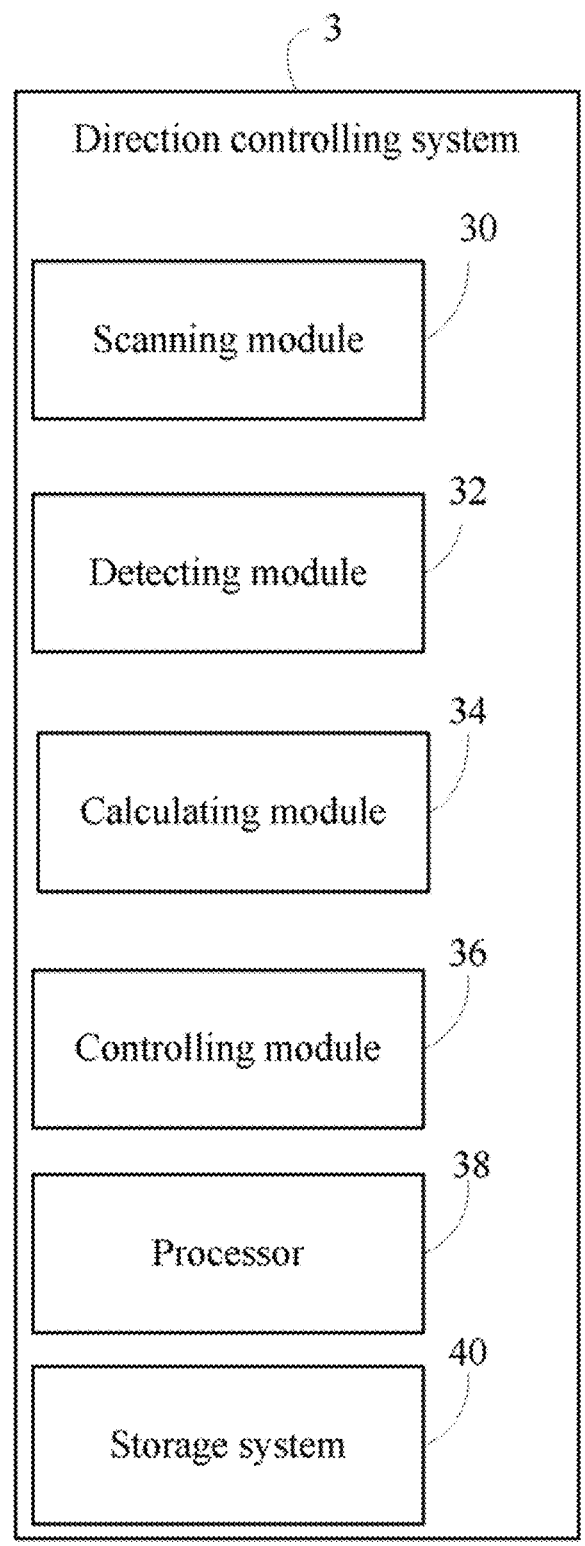
FIG. 2 is a block diagram of one embodiment of function modules of the direction controlling system in FIG. 1.

FIG. 2 is a block diagram of one embodiment of function modules of the direction controlling system 3 in FIG. 1. In one embodiment, the direction controlling system 3 may include a scanning module 30, a detecting module 32, a calculating module 34, and a controlling module 36. It may be understood that one or more specialized or general purpose processors, such as a processor 38, may be used to execute one or more computerized codes of the function modules 30-36. The one or more computerized codes of the functional modules 30-36 may be stored in a storage system 40.

Figure 5:
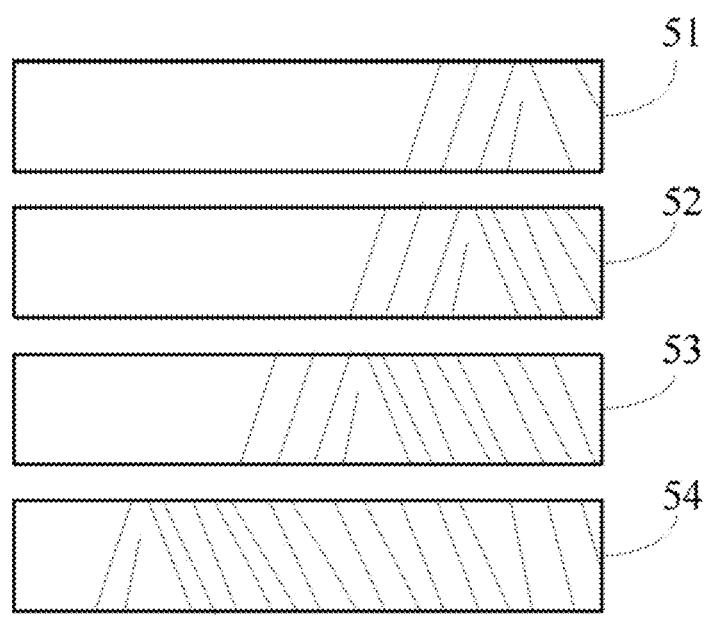
FIG. 5 illustrates one embodiment of consecutive fingerprint images.

The scanning module 30 captures the sequence of fingerprint images when a finger moves on the fingerprint identification device 2. In one embodiment, the scanning module 30 captures four consecutive images. As shown in FIG. 5, the image 51, image 52, image 53, and image 54 are captured sequentially in a timely manner. The scanning module 30 also captures a fingerprint template image of the finger and stores the fingerprint template image in the storage system 40.

The detecting module 32 determines a directional movement of the fingerprints on the fingerprint identification device 2 according to the consecutive images and the fingerprint template image.

In one embodiment, the detecting module 32 detects if at least two consecutive images in the sequence of fingerprint images have blank areas. If at least two consecutive images have blank areas, the detecting module 32 computes if the finger moved in a leftward direction or in a rightward direction on the fingerprint identification device 2. If there are blank areas in a left side in each of the at least two consecutive images, the detecting module 32 determines that the finger has moved in a leftward direction on the fingerprint identification device 2. If there are blank areas in a right side in each of the at least two consecutive images, the detecting module 32 determines that the finger has moved in a rightward direction on the fingerprint identification device 2.

Figure 6:
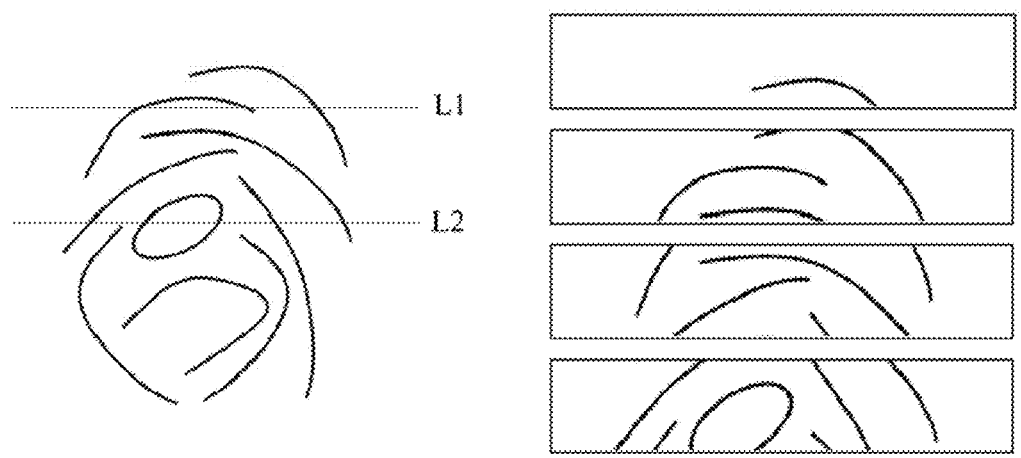
FIG. 6 illustrates one embodiment of detecting a finger moving up or down on the electronic device.

If no two consecutive images have blank areas, the detecting module 32 detects if there are any blank images in the fingerprint images. If there are no blank images in the fingerprint images, the detecting module 32 determines that the finger has moved in an upward direction or in a downward direction on the fingerprint identification device 2. If the fingerprint pattern in the first of the two consecutive images in the sequence of fingerprint images is at a higher position relative the fingerprint pattern in the following image in the consecutive images, the detecting module 32 determines that the finger has moved in the downward direction. If the fingerprint pattern in the first of the two consecutive images in the sequence of fingerprint images is at a lower position relative the fingerprint pattern in the following image in the consecutive images, the detecting module 32 determines that the finger has moved in the upward direction. For example, as shown in FIG. 6, the detecting module 32 records a fingerprint position L1 in the fingerprint template image corresponding to the fingerprint pattern in a fingerprint image which is captured first. Furthermore, the detecting module 32 records a fingerprint position L2 in the fingerprint template image corresponding to the fingerprint pattern in a fingerprint image which is captured last. If the fingerprint position L1 is higher than the fingerprint position L2, the detecting module 32 determines that the finger has moved in the downward direction on the fingerprint identification device 2. If the fingerprint position L1 is lower than the fingerprint position L2, the detecting module 32 determines that the finger has moved in the upward direction on the fingerprint identification device 2.

If there is at least one blank image in the fingerprint images, the detecting module 32 detects if there is only one full fingerprint image. If there is only one full fingerprint image, the detecting module 32 determines the fingerprint identification device 2 has been tapped. In one embodiment, that the fingerprint identification device 2 is tapped may be understood that the fingerprint identification device 2 is clicked by the finger. If there are at least two full fingerprint images, the detecting module 32 determines that the fingerprint identification device 2 has been double tapped.

The calculating module 34 calculates a movement distance "x" of the fingerprint, and calculates a displacement speed "v" of the fingerprint according to the movement distance "x". A formula of calculating the displacement speed is as follows: v=x/t. The "t" denotes a time interval between two consecutive fingerprint images.

The calculating module 34 calculates a movement distance of a scroll bar on the display screen 4 of the electronic device 1 according to the displacement speed. In one embodiment, the scroll bar may be a vertical scroll bar and a horizontal scroll bar. If 0<v<1.5 cm/s, the scroll bar may move 0.5 cm. If 1.5 cm/s≦v≦4 cm/s, the scroll bar may move 1 cm. If 4 cm/s≦v<15 m/s and the finger moved in a leftward direction or a rightward direction, the scroll bar may move a distance of half of a width of the display screen 4. If 4 cm/s≦v≦15 m/s and the finger moved in an upward direction or a downward direction, the scroll bar may move a distance of half of a length of the display screen 4. If v 15 cm/s, the scroll bar may move a distance of the width or the length of the display screen 4, namely the display screen 4 may display a next page.

The controlling module 36 controls movement of the scroll bar according to the calculated movement distance.

Figure 3:
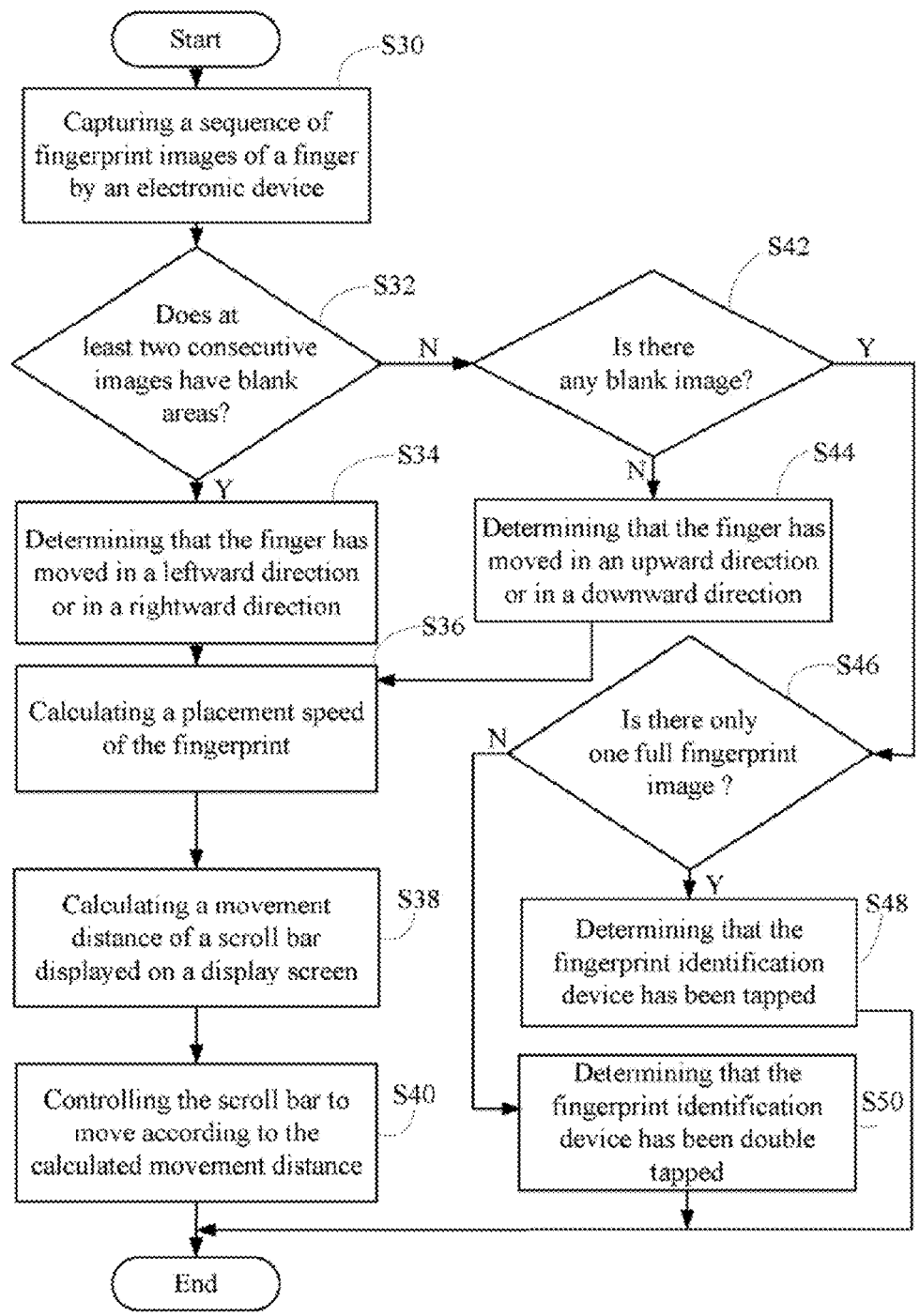
FIG. 3 is a flowchart of one embodiment of a direction controlling method of an electronic device.

FIG. 3 is a flowchart of one embodiment of a direction controlling method of an electronic device. Depending on the embodiment, additional blocks may be added, others removed, and the ordering of the blocks may be changed.

In block S30, the scanning module 30 captures a sequence of fingerprint images of when a finger moves on the fingerprint identification device 2.

In block S32, the detecting module 32 detects if at least two consecutive images in the sequence of fingerprint images have blank areas. If at least two consecutive images have blank areas, the procedure goes to S34.

In block S34, the detecting module 32 determines that the finger moved in a leftward direction or in a rightward direction on the fingerprint identification device 2. If there are blank areas in a left side in each of the at least two consecutive images, the detecting module 32 determines that the user finger has moved in a leftward direction on the fingerprint identification device 2. If there are blank areas in a right side in each of the at least two consecutive images, the detecting module 32 determines that the finger has moved in a rightward direction on the fingerprint identification device 2.f In block S36, the calculating module 34 calculates a displacement speed "v" of the fingerprint. In one embodiment, the calculating module 34 calculates a movement distance "x" of the fingerprint. Then the calculating module 34 calculates the displacement speed "v" according to the movement distance "x".

In block S38, the calculating module 34 calculates a movement distance of a scroll bar on the display screen 4.

In block S40, the controlling module 36 controls the scroll bar to move according to the calculated movement distance of the scroll bar.

In block S32, if no two consecutive images have blank areas, in block S42, the detecting module 34 detects if there are any blank images in the fingerprint images. If there are no blank images in the fingerprint images, the procedure goes to block S44. If there is at least one blank image in the captured image, the procedure goes to S46.

In block S44, the detecting module 32 determines that the finger has moved in an upward direction or in a downward direction, and the procedure returns to block S36. In one embodiment, as shown in FIG. 6, the detecting module 32 records a fingerprint position L1 in the fingerprint template image corresponding to the fingerprint pattern in a fingerprint image which is captured at first. Furthermore, the detecting module 32 records a fingerprint position L2 in the fingerprint template image corresponding to the fingerprint pattern in a fingerprint image which is captured at last. If the fingerprint pattern in the first of the two consecutive images in the sequence of fingerprint images is at a higher position relative the fingerprint pattern in the following image in the consecutive images, the detecting module 32 determines that the finger has moved in the downward direction. If the fingerprint pattern in the first of the two consecutive images in the sequence of fingerprint images is at a lower position relative the fingerprint pattern in the following image in the consecutive images, the detecting module 32 determines that the finger has moved in the upward direction.

In block S46, the detecting module 32 detects if there is only one full fingerprint image. If there is only one full fingerprint image, in block S48, the detecting module 32 determines that the fingerprint identification device 2 has been tapped. If there are at least two full fingerprint images, in block S50, the detecting module 32 determines that the fingerprint identification device 2 has been double tapped.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A direction controlling system of an electronic device, comprising:
   at least one processor to execute one or more programs stored in a storage system of the direction controlling system, the one or more programs comprising:

a scanning module to capture a sequence of fingerprint images of a finger when the finger moves on a fingerprint identification device of the electronic device;

a detecting module to detect when at least two consecutive fingerprint images have blank areas, determine that the finger has moved in a leftward direction or in a rightward direction on the fingerprint identification device whether at least two consecutive fingerprint images have blank areas, and to determine that the finger has moved in an upward direction or in a downward direction on the fingerprint identification device when no two consecutive fingerprint images have blank areas and there are no blank images in the fingerprint images;

and the detecting module also to detect whether there is only one full fingerprint image when there is at least one blank image, to determine that the fingerprint identification device has been tapped whether there is only one full fingerprint image, and to determine that the fingerprint identification device has been double tapped when there are at least two full fingerprint images.

2. The direction controlling system of claim 1, wherein the determining module further determines that the finger has moved in a leftward direction on the fingerprint identification device when there are blank areas in a left side in each of the at least two consecutive fingerprint images, and to determine that the finger has moved in a rightward direction on the fingerprint identification device whether there are blank areas in a right side in each of the at least two consecutive fingerprint images.

3. The direction controlling system of claim 1, wherein the storage system stores a fingerprint template image of the finger captured by the scanning module.

4. The direction controlling system of claim 3, wherein the detecting module further records a fingerprint position L1 in the fingerprint template image corresponding to the fingerprint in a fingerprint image captured at first, record a fingerprint position L2 in the fingerprint template image corresponding to the fingerprint in a fingerprint image captured at last, and to determine that the finger has moved in an upward direction on the fingerprint identification device when the fingerprint position L1 is higher than the fingerprint position L2, and determine that the user finger has moved in a downward direction on the fingerprint identification device when the fingerprint position L1 is lower than the fingerprint position L2.

5. The direction controlling system of claim 1, further comprising:
   a calculating module to calculate a displacement speed of the fingerprint, and to calculate a movement distance of a scroll bar displayed on a display screen of the electronic device according to the displacement speed; and
   a controlling module to control movement of the scroll bar according to the calculated movement distance of the scroll bar.

6. A direction controlling method of an electronic device, the direction controlling method comprising:
   (a) capturing a sequence of fingerprint images of a finger when the finger moves on a fingerprint identification device of the electronic device;
   (b) determining that the finger has moved in a leftward direction or in a rightward direction on the fingerprint identification device when at least two consecutive fingerprint images have blank areas;
   (c) determining that the finger has moved in an upward direction or in a downward direction on the fingerprint identification device on condition that no two consecutive fingerprint images have blank areas and there are no blank images in the fingerprint images;
   (d) determining that the fingerprint identification device has been tapped on condition that there is at least one blank image and there is only one full fingerprint image; and (e) determining that the fingerprint identification device has been double tapped on condition that there is at least one blank image and there are at least two full fingerprint images.

7. The direction controlling method of claim 6, further comprising:
   calculating a displacement speed of the fingerprint when the finger has moved in a leftward direction or in a rightward direction on the fingerprint identification device, or when the user finger has moved in an upward direction or a downward direction on the fingerprint identification device;
   calculating a movement distance of a scroll bar on a display device of the electronic device according to the displacement speed; and
   controlling the scroll bar to move according to the calculated movement distance of the scroll bar.

8. The direction controlling method of claim 6, wherein step (b) comprises:
   determining that the finger has moved in a leftward direction when there are blank areas in a left side in each of the at least two consecutive fingerprint images; and
   determining that the finger has moved in a rightward direction whether there are blank areas in a right side in each of the at least two consecutive fingerprint images.

9. The direction controlling method of claim 6, wherein step (c) comprises:
   recording a fingerprint position L1 in the fingerprint template image corresponding to the fingerprint pattern in a fingerprint image captured at first;
   recording a fingerprint position L2 in the fingerprint template image corresponding to the fingerprint pattern in a fingerprint image captured at last;
   determining that the user finger has moved in an upward direction when the fingerprint position L1 is higher than the fingerprint position L2; and determining that the finger has moved in a downward direction whether the fingerprint position L1 is lower than the fingerprint position L2.

10. A non-transitory computer-readable medium having stored therein instructions that, when executed by an electronic device, cause the electronic device to perform a direction controlling method of an electronic device, the direction controlling method comprising:
   (a) capturing a sequence of fingerprint images when a finger moves on a fingerprint identification device of the electronic device;
   (b) determining that the finger has moved in a leftward direction or in a rightward direction on the fingerprint identification device when at least two consecutive fingerprint images have blank areas;
   (c) determining that the finger has moved in an upward direction or in a downward direction on the fingerprint identification device on condition that no two consecutive fingerprint images have blank areas and there are no blank images in the fingerprint images;
   (d) determining that the fingerprint identification device has been tapped on condition that there is at least one blank image and there is only one full fingerprint image;

and (e) determining that the fingerprint identification device has been double tapped on condition that there is at least one blank image and there are at least two full fingerprint images.

11. The medium of claim 10, further comprising:
calculating a displacement speed of the fingerprint when the finger has moved in a leftward direction or in a rightward direction on the fingerprint identification device, or when the user finger has moved in an upward direction or a downward direction on the fingerprint identification device;
calculating a movement distance of a scroll bar on a display device of the electronic device according to the displacement speed; and
controlling the scroll bar to move according to the calculated movement distance of the scroll bar.

12. The medium of claim 10, wherein step (b) comprises:
determining that the finger has moved in a leftward direction when there are blank areas in a left side in each of the at least two consecutive fingerprint images; and determining that the finger has moved in a rightward direction whether there are blank areas in a right side in each of the at least two consecutive fingerprint images.

13. The medium of claim 10, wherein step (c) comprises:
recording a fingerprint position L1 in the fingerprint template image corresponding to the fingerprint pattern in a fingerprint image captured at first;
recording a fingerprint position L2 in the fingerprint template image corresponding to the fingerprint pattern in a fingerprint image captured at last;
determining that the user finger has moved in an upward direction when the fingerprint position L1 is higher than the fingerprint position L2;
and determining that the finger has moved in a downward direction whether the fingerprint position L1 is lower than the fingerprint position L2.

* * * * *